Aug. 24, 1948.  P. BIQUARD  2,447,485
SUPERSONIC MEASURING APPARATUS
Filed Sept. 27, 1943  2 Sheets-Sheet 1

INVENTOR.
PIERRE BIQUARD
BY
AGENT

Aug. 24, 1948.   P. BIQUARD   2,447,485
SUPERSONIC MEASURING APPARATUS
Filed Sept. 27, 1943   2 Sheets-Sheet 2
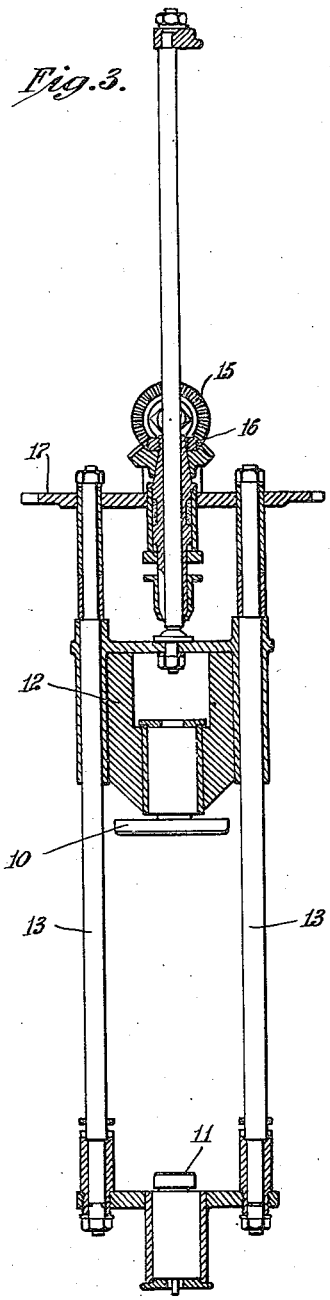
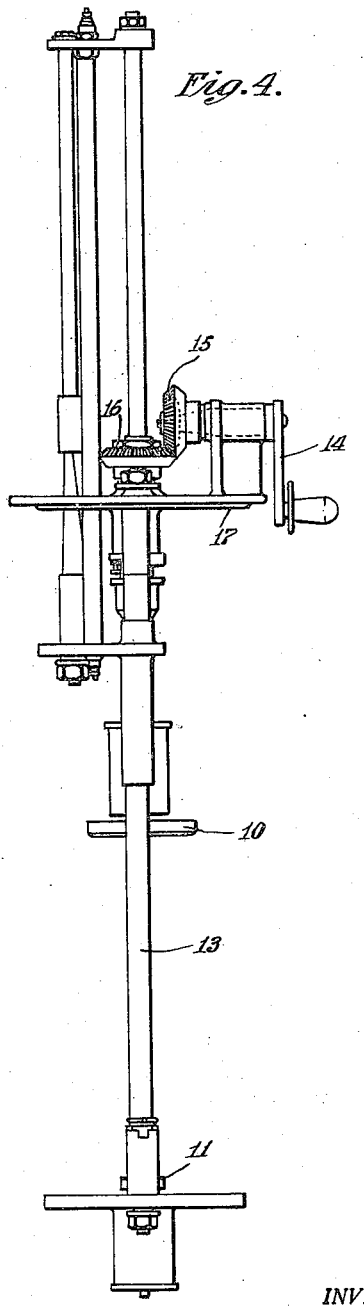
INVENTOR.
PIERRE BIQUARD
BY
AGENT Patented Aug. 24, 1948

2,447,485

UNITED STATES PATENT OFFICE 2,447,485

SUPERSONIC MEASURING APPARATUS

Pierre Biquard, Boulogne-Billancourt, France, assignor to International Standard Electric Corporation, New York, N. Y., a corporation of Delaware Application September 27, 1943, Serial No. 504,085
In France June 4, 1942

4 Claims. (Cl. 178—44)

1

The present invention relates to devices that are applicable to apparatus making use of supersonic waves, to compensate for the effects of variations of temperature.

As one object and advantage of the present invention, the variations that are observed in the measurement of time intervals, when use is made of retardation lines employing supersonic wave propagation phenomena, are compensated for in such a way as to introduce no error in reading the indications of the apparatus employed.

According to one embodiment of this invention, the medium in which the supersonic waves are propagated consists of a mixture of substances, so chosen that the variations of the speed of propagation due to temperature changes, are nil.

According to another embodiment, use is made of a mixture of substances, so chosen that the variations of the speed of propagation due to changes in temperature, are such that they compensate for other variations, e. g. for the thermal expansion of a supporting member of the apparatus.

This invention is hereinafter explained, with reference to the appended drawings, in which:

Fig. 3 illustrates in cross-sectional elevation one form of apparatus in which this invention is utilized.

Fig. 4 shows the apparatus of Fig. 3 in side elevation.

It is already known that the propagation of a train of supersonic waves in a fluid may be utilized to constitute a retardation line and that the supersonic echoes may similarly be used for the measurement of very short intervals of time, particularly in precision telemetry, such as in the case of range-finding devices.

In both of these cases, account is taken of the time taken by the train of waves to traverse, in a fluid medium, a distance which is known and which distance is variable at will.

The two factors, distance and speed of propagation, are dependent upon the temperature and no true indication will be given by a retardation line or precision telemetric device unless the entire unit is arranged in a thermostatically controlled vessel, or unless this entire unit is formed in such a way as to furnish indications which shall be independent of the temperature.

Furthermore, the most important disturbing factor by far is that the variation of the speed of propagation of the sound waves as a result of the temperature.

For the case of water, for example, Dörsing (1908) states that the speed of sound increases from 1441 m./sec. to 1505 m./sec. between 13° and 31° C. This gives for 20° C.:

$$\frac{1}{V_{20°}} \frac{dV}{d\theta} = +2.43 \cdot 10^{-3}$$

Numerous measurements have been made for organic liquids, particularly by E. B. Freyer, J. C. Hubbard and D. H. Andrews (J. Am. Chem. Soc., 51, 1929, pp. 759–770).

Let us note, for example, toluene, for which—

$$\frac{1}{V_{20°}} \frac{dV}{d\theta} = -3.24 \cdot 10^{-3}$$

and ethyl alcohol, for which—

$$\frac{1}{V_{20°}} \frac{dV}{d\theta} = -3 \cdot 10^{-3}$$

The expansion of the basic constructional materials used in the manufacture of these devices, e. g. steel, gives rise to less important variations ($1.14 \cdot 10^{-5}$ per degree C.).

Several authors have studied the speed of propagation of supersonic waves in mixtures of liquids, particularly E. Bright Wilson, J. V. and W. T. Richards (J. Phys. Chem., 36, 1932, p. 1268); S. Parthasarathy (Proc. Indian Acad. Sc., 3, 1936, pp. 297–303), etc.

From these articles it is seen that the speed of sound varies in a linear fashion over a substantial range of temperatures, dependent upon the concentration by weight or by molecular weight, of one of the components of the mixture. The fact that the speed of propagation increases for water with increase of temperature, while it diminishes for most of the other liquids that have been investigated, makes it possible to predict that a suitable mixture of water and of a liquid miscible with water, such as acetone or ethyl alcohol, will have a speed of propagation that will be independent of the temperature over a defined range, or preferably such a thermally caused variation of this speed that it will exactly counterbalance or offset the expansion of the metal of which the container is made.

Figure 1:
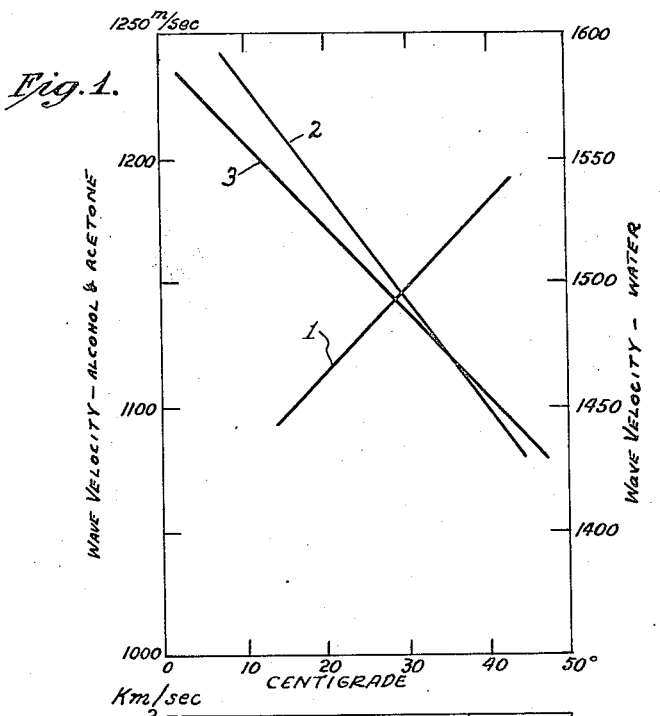
Fig. 1 shows the variations of the speed of propagation of supersonic waves, in distilled and degasified water, ethyl alcohol and acetone as the temperature is changed.

Referring to Fig. 1, this shows for various pure media the speed of propagation of supersonic waves, dependent upon the temperature.

Curve 1 shows the variations of the speed in distilled and degasified water. It can be seen in this case that the speed increases with the temperature, while it can be seen that the speed of propagation in ethyl alcohol (curve 2) and in acetone (curve 3) diminishes with increase of temperature.

It can be seen that the variations of the speeds take place in opposite directions and that by a mixture of two of these substances, e. g. water and ethyl alcohol, it is possible to obtain a medium in which the variation of the speed dependent upon the temperature may have a variation that is comprised between the two curves shown for the two elements, when considered in their pure state.

Assuming that the speed of propagation in water is given by the equation $$Va = V_0(1 + \alpha t)$$

$t$ being the temperature and $V_0$ the speed at 0° C., and $\alpha$ a coefficient, and in ethyl alcohol—

$$Vb = V_1(1 - \beta t)$$

$V_1$ being the speed at 0° C. and $\beta$ a coefficient, from this we get as first approximation for the speed of propagation in a mixture of $p$ molecules of water with $q$ molecules of alcohol—

$$V_{pq} = \frac{pV_a + qV_b}{p+q} = \frac{pV_0 + p\alpha t + qV_1 - q\beta t}{p+q}$$

For any particular case, there will be obtained a speed of propagation that does not vary substantially with the temperature when—

$$p\alpha - q\beta = 0$$

as a first approximation.

Figure 2:
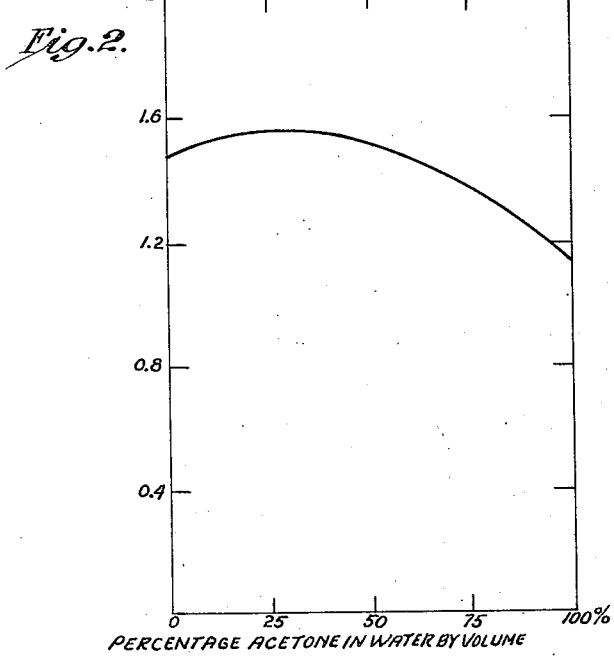
Fig. 2 shows the variations of the speed of propagation in certain mixtures, as dependent upon the relative proportion of their component ingredients.

The water-acetone mixture, for example, has been studied by G. W. Willard (Journal of the Acoustical Society of America, 12, 1941, pp. 438-448) and the curve shown in Fig. 2 reproduces the findings of that author. The abscissa represents percentage acetone in water (by volume) and the ordinate represents velocity "V" in kilometers per second. It can be seen that for acetone concentrations of between 25 and 100% by volume, the speed varies substantially linearly with the volume of the concentrations within the limits represented in Fig. 1, and that a mathematical determination of the kind above given is applicable.

It is also possible to select a mixture that will give the speed of propagation in a certain range of temperatures a variation dependent upon the rising or falling of the temperature, i. e. a positive or a negative thermal coefficient. According to certain features of the invention, it is possible to select the speed of propagation in such a way as to compensate for temperature effects in a range of temperatures, e. g. to compensate for the expansion or contraction of a metal support employed for the electromechanical members of a supersonic device.

Figs. 3 and 4 illustrate an embodiment of the invention as applied to a device for the measurement of the time intervals, of a type familiar in the prior art.

In this embodiment, the measurement of the time intervals is effected by measurement of the distance traversed by a train of supersonic waves during these time intervals.

In the drawing, 11 illustrates a piezo electric crystal to which there is applied an electrical oscillation or impulse which generates a supersonic wave. At 10, there is a reflector which is carried on a movable support 12 along two columns 13, of any suitable material such as stainless steel or bronze.

Adjustment of the distance is effected by means of the crank 14 which acts on a gear wheel, which latter in turn rotates a nut 16.

It is evident that the distance between reflector 10 and the advancing mechanism support at 17 is influenced by variations of temperature.

According to certain features of this invention, these are the variations of temperature that it is possible to compensate for completely, by a reverse variation of the speed of propagation of the supersonic waves in the liquid, into which the device here illustrated is submerged.

According to this invention, it is also possible to select such a frequency for the oscillating crystal that the velocity-temperature variation curve will show some special characteristic for this particular frequency, e. g. so that it will be substantially level, in order to widen the wave range over which the device operates, or in order to allow the use of a particular liquid.

Although the present invention has been described by illustrating one example of an embodiment thereof, it is clear that it is by no means limited to this example but is capable of variations and modifications that will be evident to one skilled in the art, and I am limited only by the scope of the hereunto appended claims.

What is claimed is:

1. In a device for determining time intervals by passing supersonic waves from one supported element to another supported element and measuring the distance between said elements, a liquid filling the entire path of said supersonic waves between said elements and comprising a mixture of substances of definite composition and having opposing thermal coefficients with respect to the speed of propagation of supersonic waves therethrough, said mixture having a thermal coefficient just sufficient in sign and degree to offset substantially variations in the distance between said elements brought about by variation of the coefficient of thermal expansion of the means supporting both elements over a predetermined range of temperatures for example the so-called room temperature range.

2. In supersonic measuring apparatus including two elements forming a space between which ultrasonic waves pass, the method of compensating for thermal expansion of the physical structure determining the spacing of said two elements resulting from temperature variations over a predetermined range of temperatures, which includes providing in that space a liquid and adjusting its composition so as to have a thermal-propagation-speed coefficient just sufficient and of suitable sign to offset in effect said thermal expansion over the range of operating temperatures of said measuring apparatus.

3. In combination, a supersonic device including a producer of supersonic waves, a reflector of said waves, means for spacing said producer and said reflector, and a liquid bathing all of said elements and having a thermal-propagation-speed coefficient just sufficient and of suitable sign to offset in effect the thermal expansion of said spacing means, over a predetermined range of temperatures for example the so called room temperature range.

4. A transmission line for carrying supersonic waves including terminals and an intervening transmission medium comprising in a support a liquid consisting of an admixture of at least two different substances in such relative proportion and the substances having a thermal coefficient of speed of propagation so related, that the thermal-propagation-speed coefficient of said admixture is sufficient to compensate the variations in line length of the medium due to the coefficient of thermal expansion of the support and terminals.

PIERRE BIQUARD.

REFERENCES CITED

The following references are of record in the file of this patent:

UNITED STATES PATENTS

| Number | Name | Date |
| --- | --- | --- |
| 2,407,294 | Shockley et al. | Sept. 10, 1946 |

OTHER REFERENCES

"Bureau of Standards Journal of Research," vol. 8, January 1932, pages 79 through 99, Research Paper No. 402. Pages 81 through 83 and 94 through 96 particularly relied upon. Copy in Patent Office Scientific Library.